United States Patent
Small et al.

(10) Patent No.: US 9,371,838 B2
(45) Date of Patent: *Jun. 21, 2016

(54) INTEGRAL SCROLL AND GEARBOX FOR A COMPRESSOR WITH SPEED CHANGE OPTION

(71) Applicant: Ingersoll-Rand Company, Davidson, NC (US)

(72) Inventors: Robert Small, Williamsville, NY (US); Robert M. Kolodziej, Varysburg, NY (US); Edward S. Czechowski, Orchard Park, NY (US)

(73) Assignee: Ingersoll-Rand Company, Davidson, NC (US)

( * ) Notice: Subject to any disclaimer, the term of this patent is extended or adjusted under 35 U.S.C. 154(b) by 617 days.

This patent is subject to a terminal disclaimer.

(21) Appl. No.: 13/791,897

(22) Filed: Mar. 8, 2013

(65) Prior Publication Data

US 2013/0195625 A1  Aug. 1, 2013

Related U.S. Application Data

(63) Continuation of application No. 12/525,817, filed as application No. PCT/US2008/059169 on Apr. 2, 2008, now Pat. No. 8,393,856.

(60) Provisional application No. 60/921,547, filed on Apr. 3, 2007.

(51) Int. Cl.
*F04D 25/02* (2006.01)
*F04D 29/00* (2006.01)
(Continued)

(52) U.S. Cl.
CPC .............. *F04D 29/002* (2013.01); *F04D 17/12* (2013.01); *F04D 25/02* (2013.01); *F04D 25/163* (2013.01);
(Continued)

(58) Field of Classification Search
CPC ... F04D 29/403; F04D 29/053; F04D 29/054; F04D 29/056; F04D 29/102; F04D 29/122; F04D 29/4213; F04D 29/44; F04D 29/4206; F04D 27/002; F05D 2250/312; F05D 2260/4031

See application file for complete search history.

(56) References Cited

U.S. PATENT DOCUMENTS

| | | | |
|---|---|---|---|
| 1,998,778 A | 4/1935 | Gregg | |
| 3,163,999 A | 1/1965 | Kircimer et al. | |

(Continued)

FOREIGN PATENT DOCUMENTS

| | | |
|---|---|---|
| CH | 456284 | 5/1968 |
| DE | 569094 | 1/1933 |

(Continued)

OTHER PUBLICATIONS

PCT International Search Report and Written Opinion for PCT/US08/059169, dated Jul. 3, 2008.

(Continued)

*Primary Examiner* — Ninh H Nguyen
(74) *Attorney, Agent, or Firm* — Taft Stettinius & Hollister LLP

(57) ABSTRACT

The volute is cast integrally with the gearbox base to allow closer radial tolerances to be used to improve efficiency. In the preferred embodiment, compressors for multi-stage compression are assembled with intercoolers and the integral volute is cast together with the impeller housing and the lower gearbox housing and the associated intercooler. Efficiency increases of 2% or more are achievable. In multistage applications, efficiency gains in the early stages are compounded in each subsequent stage. Speed changes that change center distance between bull gear and pinion are accommodated by an offset opening in the inlet and diffuser that can line up with the impeller shaft as well as an offset opening in the fluid seal despite a pinion gear change, by reorientation and remounting of those parts.

20 Claims, 7 Drawing Sheets

(51) Int. Cl.
  *F04D 29/42* (2006.01)
  *F04D 29/44* (2006.01)
  *F04D 29/05* (2006.01)
  *F04D 29/054* (2006.01)
  *F04D 29/056* (2006.01)
  *F04D 17/12* (2006.01)
  *F04D 25/16* (2006.01)
  *F04D 27/02* (2006.01)

(52) U.S. Cl.
  CPC ............ *F04D 27/0261* (2013.01); *F04D 29/05* (2013.01); *F04D 29/054* (2013.01); *F04D 29/056* (2013.01); *F04D 29/4206* (2013.01); *F04D 29/4213* (2013.01); *F04D 29/44* (2013.01)

(56) References Cited

U.S. PATENT DOCUMENTS

| | | | |
|---|---|---|---|
| 3,664,001 A * | 5/1972 | Pilarczyk | F04D 29/4206 29/888.021 |
| 3,871,723 A | 3/1975 | Pray | |
| 5,267,452 A | 12/1993 | Zinsmeyer et al. | |
| 5,749,224 A * | 5/1998 | Bebensee | F04D 29/2216 29/888.021 |
| 8,393,856 B2 * | 3/2013 | Small | F04D 17/12 415/122.1 |

FOREIGN PATENT DOCUMENTS

| | | |
|---|---|---|
| DE | 4135750 | 10/1992 |
| DE | 19624074 | 12/1997 |
| FR | 1335644 | 8/1963 |

OTHER PUBLICATIONS

Written Opinion by the Australian Patent Office for Application No. SG 200905456-0, dated Dec. 22, 2009.

Examination Report by the Intellectual Property Office of Singapore for Application No. SG 200905456-0, dated Oct. 6, 2010.

Office Action by the European Patent Office for Application No. 08 744 960.9, dated Dec. 15, 2010.

* cited by examiner

INTEGRAL SCROLL AND GEARBOX FOR A COMPRESSOR WITH SPEED CHANGE OPTION

CROSS-REFERENCE TO RELATED APPLICATIONS

This application claims priority to U.S. Non-Provisional application Ser. No. 12/525,817 entitled "Integral Scroll and Gearbox for a Compressor with Speed Change Option", filed on Aug. 4, 2009, which is herein incorporated by reference in its entirety, and which claims priority to PCT Application No. PCT/US2008/059169 entitled "Integral Scroll and Gearbox for a Compressor with Speed Change Option", filed on Apr. 2, 2008, which is herein incorporated by reference in its entirety, and which claims priority to U.S. Provisional Patent Application No. 60/921,547, entitled "Integral Scroll and Gearbox for a Compressor with Speed Change Option", filed on Apr. 3, 2007, which is herein incorporated by reference in its entirety.

FIELD OF THE INVENTION

The present invention generally relates to centrifugal compressors, such as, for example, assemblies of compressors for multistage compression wherein the integral casting further includes a gearbox and intercooler housings.

BACKGROUND OF THE INVENTION

Centrifugal compressors supply oil-free compressed gas in a variety of industrial applications. A common application of a centrifugal compressor is in plant air systems, to supply a motive force for valve actuators and pneumatic cylinders used in robotic applications, as one example. Centrifugal compressors typically feature an impeller mounted in a closely-conforming impeller chamber. The chamber features an axial inlet port to allow fluid entry toward the center of the impeller. Fluid is drawn into the impeller due to its rotation at speeds that can exceed 75,000 revolutions per minute (RPM). The rotation of the impeller propels the fluid through an annular diffuser passageway and into a surrounding volute. The energy imparted into the fluid by the impeller's rotation increases the fluid's velocity and, consequently, pressure as the fluid passes the diffuser passageway into the scroll or volute. The diffuser passage way has inside and outside radial dimensions for each circumferential station of the impeller chamber and scroll. By definition, the inside radius of the diffuser section corresponds to the distance to the diffuser throat or the location at which the annular port or passageway has the smallest axial width for the given station, the diffuser section extending outwardly for the remainder of the annular passageway.

Traditionally, centrifugal compressors have featured a bolt on scroll/volute cover, which encompassed portions of the impeller chamber, the diffuser passageway and the volute-outlet passageway. U.S. Pat. No. 4,181,466 is illustrative of a bolt-on component featuring a fluid entry 51 and a volute 50 that is secured to the bearing housing 15 by a V-clamp 49. A difficulty with the bolt-on scroll/volute cover incorporating the volute is the effective control of tip clearance between the impeller and the inlet passageway and the clearance between the impeller and the volute outlet. Due to the bolt-on construction previously employed, machining costs and assembly costs affected the finished cost of the product. The assembly of a plurality of components required the use of greater clearances around the impeller, which sacrificed compressor efficiency. This, in turn, required larger drivers and higher operating costs for electric power. Since each assembled component has a manufacturing tolerance, the final clearance near the impeller has to be sufficiently large to accommodate a situation where all the tolerances in the individual components of the assembly turned out within specification but all dimensions on the individual components were off from the ideal dimension and on the same side of the tolerance allowed.

Another problem with bolt-on volutes, i.e., 24 and 26, is the extra space and mass taken up by that type of assembly. Such space could become important in situations where ease of installation and maintenance is important to serviceability. For example, as will be explained below, use of bolt-on volutes (such as 24 and 26) hinders access to the driver shaft for an oil pump to be directly driven. The extra housing thickness for each stage in a multi-stage skid could preclude a direct drive on the oil pump and may necessitate a separate electrical drive for the oil pump. This would be undesirable in the event of an electrical failure. In an electrical failure, the impeller bearings need lubrication, as the impeller slows from its operating speed of 75,000 RPM or more. Bearing failure could result with an electrically driven oil pump if it stopped delivering oil too abruptly on power failure. A power takeoff from the main drive shaft, which could involve gears or belts, adds to the complication of packaged systems and tends to complicate access when maintenance is required.

One issue that remains unresolved by the integral casting of the volute as part of the gearbox is what can be done if the end user needs a capacity change that involves a speed change to one or more stages in a compressor assembly. Normally, such a speed change involves a gear ratio change. Typically, the end user prefers to simply change a pinion 34 shown in FIG. 2 while retaining the much larger bull gear 32. The reasons for this preference are cost and speed of getting the replacement parts. It is far easier for the original equipment manufacturer to stock a variety of pinions than to have a lot of cash tied up in very large parts such as different bull gears 32. However, using a different sized pinion with the same bull gear changes the center to center distance between them and the scroll is integrally cast to a fixed center to center distance.

SUMMARY

In accordance with certain embodiments, the volute is cast integrally with the gearbox base to allow closer radial tolerances to be used to improve efficiency. In one embodiment, compressors for multi-stage compression are assembled with intercoolers and the integral volute is cast together with the impeller housing and the lower gearbox housing and the associated intercooler. Efficiency increases of 2% or more are achievable. In multistage applications, efficiency gains in the early stages are compounded in each subsequent stage. Speed changes that change center distance between bull gear and pinion are accommodated by an offset opening in the inlet and diffuser that can line up with the impeller shaft as well as an offset opening in the fluid seal despite a pinion gear change, by reorientation and remounting of those parts including the bearings that support them. Either the pinion or the bull gear or both can be moved to change the shaft center distance to accommodate the new gear pairing to get the desired speed.

The present invention, in the exemplary context of and integral scroll and gearbox, provides a way to accommodate the differing center to center distances of the gear drive from a speed change by allowing the scroll to accept an end plate with an eccentric opening that can be mounted in a variety of positions to accommodate different center to center distances for example. The bearing housing that is placed in the casting at the gearbox location is selected to also accommodate this offset and an insert shown in FIGS. 7 and 8 can also be mounted to maintain the relation of the inlet opening 76 to the position of the shaft 38 that supports the impeller 36 and the pinion gear 34. Alternatively, the present invention can accommodate changing the center distance between the bull gear and the pinion by moving the bull gear centerline using offset bearing housings for its shaft, for example. As yet another alternative and exemplary embodiment, the present invention, depending on the new desired speed, can have both shafts moved to increase or decrease the center distance to accommodate the new gearing combinations selected to get the desired speed.

These and other advantages of the present invention will become more apparent to a person of skill in the art from a review of the description of the exemplary embodiments described below.

DETAILED DESCRIPTION OF THE PREFERRED EMBODIMENT

Figure 1:
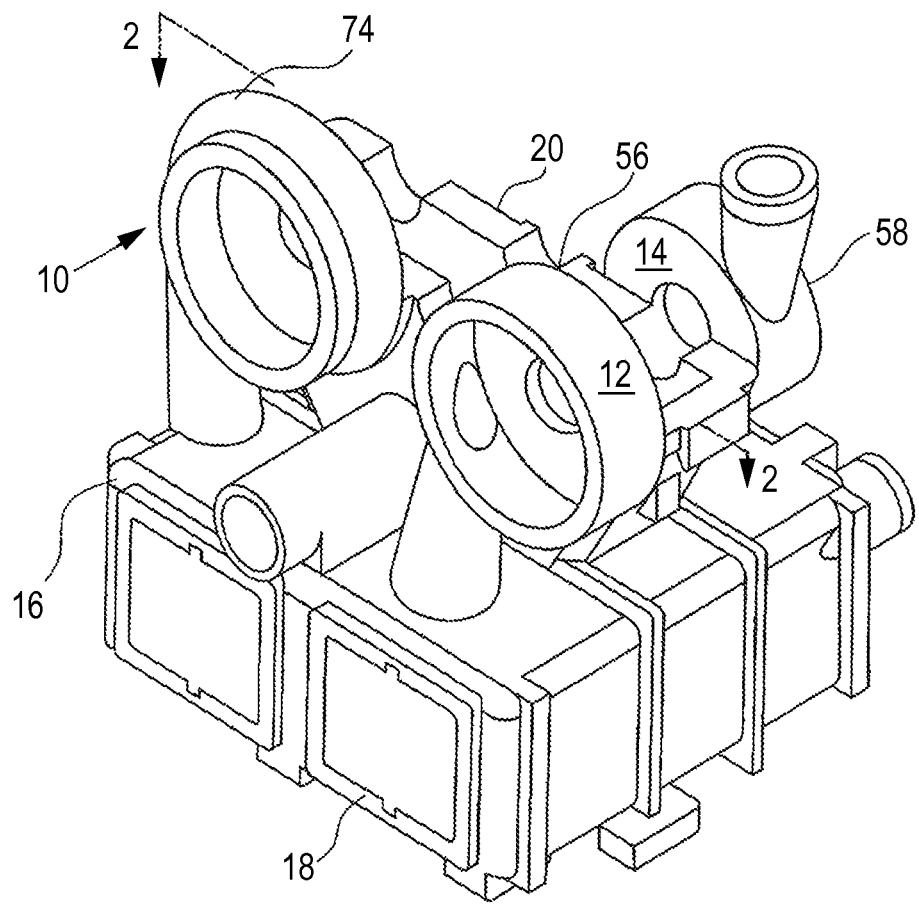
FIG. 1 is a perspective view a prior art of a three-stage centrifugal compressor skid showing the first stage compressor housing with volute cast integrally with the lower gearbox housing and the first stage intercooler housing.

Referring to FIG. 1, this figure, which is in a perspective view, has portions removed for clarity. For example, the motor driver for the package is omitted. The illustrated package comprises a first stage 10, a second stage 12, and a third stage 14. In essence, FIG. 1 is a drawing of a casting, which further comprises a first-stage intercooler housing 16, a second-stage intercooler housing 18 and the lower end of the gearbox 20. An after-cooler (not shown) can be used after the third stage 14. The first stage 10 has an inlet 22 omitted from FIG. 1 but shown in section in FIG. 2. Second stage 12 has a differently configured inlet section 24 as compared to the first stage inlet 22. Third stage 14 has an inlet 26 similarly configured to inlet 24. The present invention, in certain instances, relates to the configuration of volute scroll 74 and its complementary inlet 22. That configuration can also be used in second stage 12 and third stage 14 within the scope of the invention.

The first stage 10 has been configured differently than stages 12 and 14 to illustrate the difference between the prior-known technique (illustrated in stages 12 and 14) from the technique of the present invention exemplified in the first stage 10. It is also different than another known technique as described in FIG. 4, item 90. It should be noted that the invention does not presuppose multiple stages and the details of the first stage 10 can be employed in a single stage installation or in a multi-stage installation, on one or more of the stages, all within the scope of the invention.

Referring again to FIG. 2, shaft 28 has a coupling 30 connected at its end. The motor driver (not shown) is coupled to coupling 30. Shaft 28 supports bull gear 32 in gear box 20. Pinion gear 34 meshes with gear 32 to drive impeller 36 in first stage 10. Shaft 38 supports the impeller 36 as well as pinion gear 34 and seals 40 along with bearings 42, disposed on either side of pinion gear 34. On the other side of the gear box 20, another pinion gear 44 is supported on a shaft 46 to operate impellers 48 and 50 on the second stage 12 and third stage 14 in tandem. Similar seal and bearing arrangements are used on shaft 46 as on shaft 38. Mounted to the end of shaft 28 is an oil pump 52, directly connected by a coupling 54.

Figure 2:
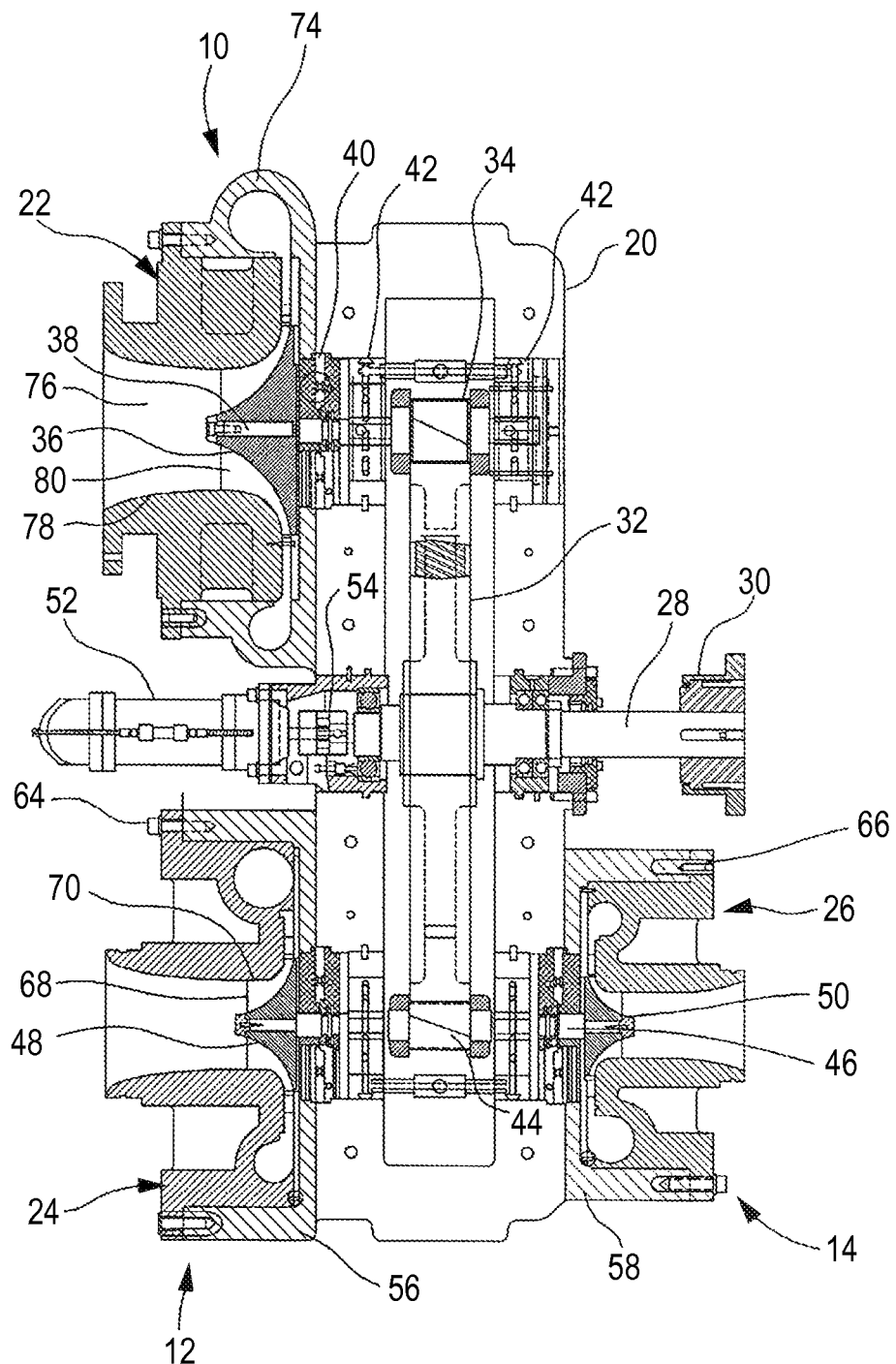
FIG. 2 is a section view along line 2-2 of FIG. 1.
Figure 3:
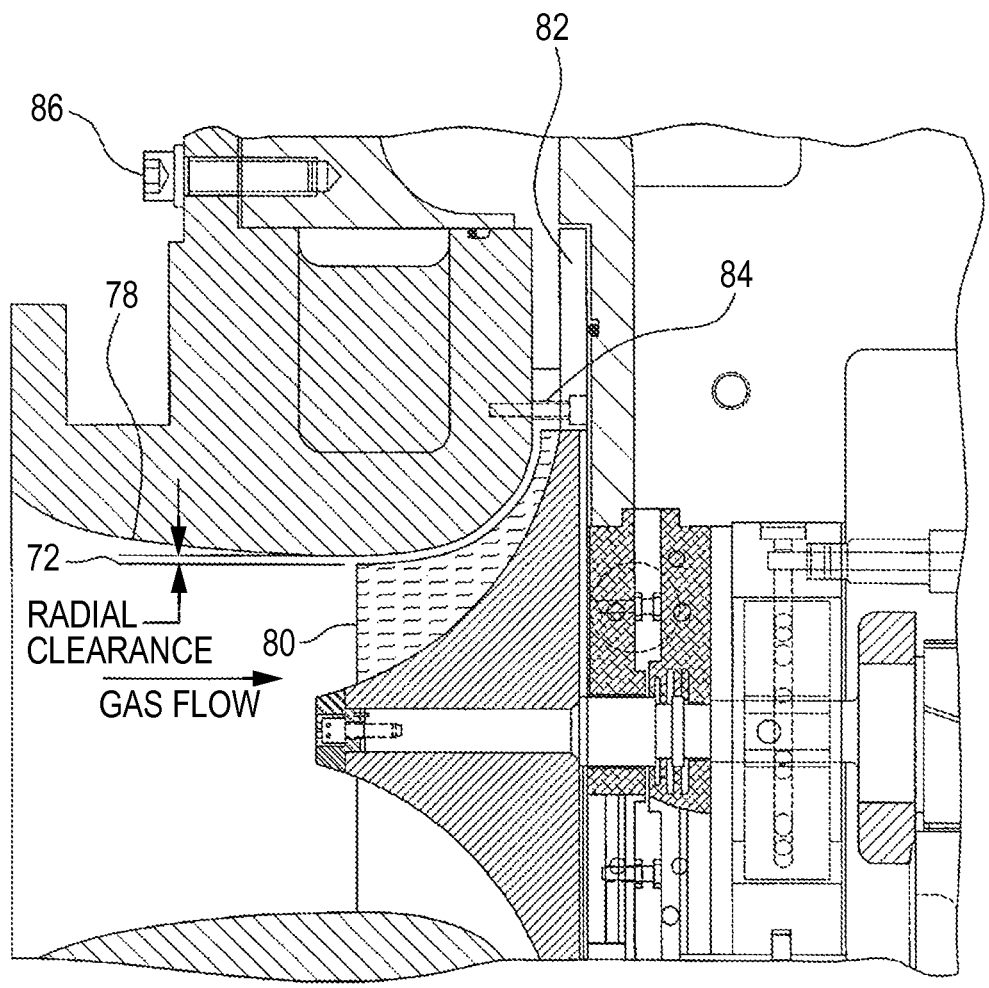
FIG. 3 is a close up view of the first-stage volute-type scroll housing shown at the top of FIG. 2.
Figure 4:
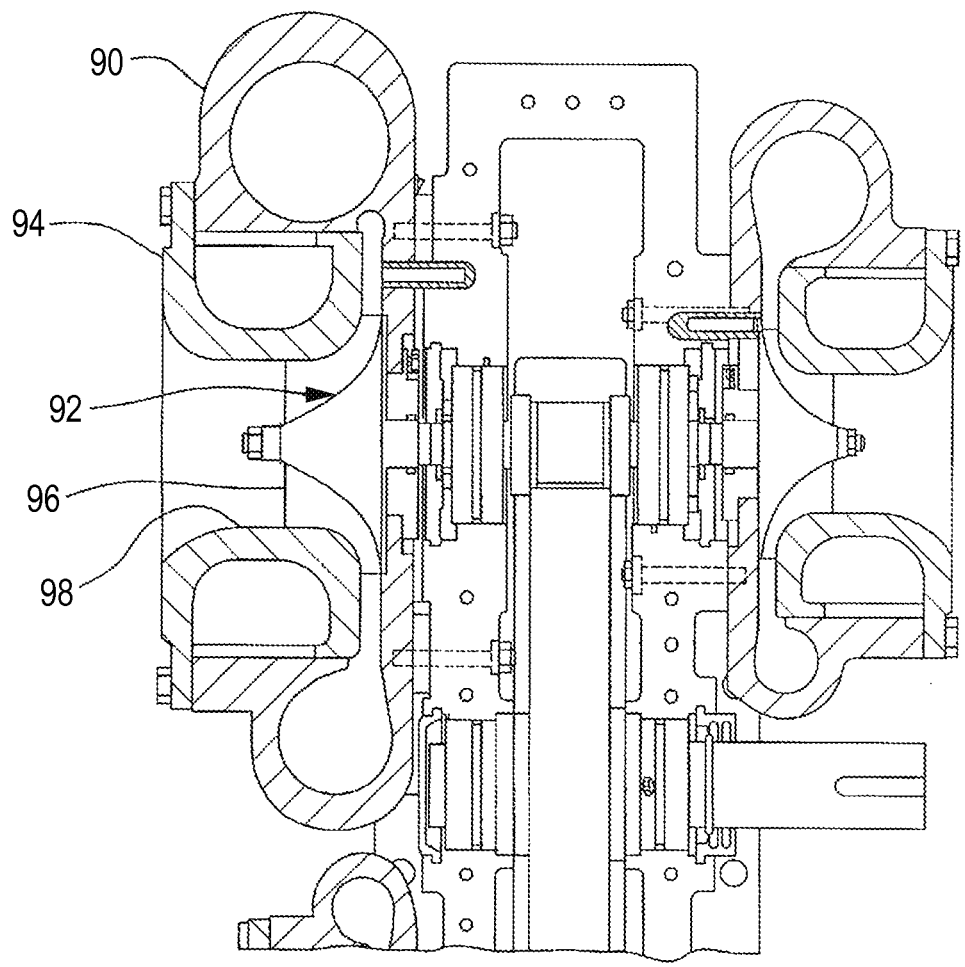
FIG. 4 is a close up view of a prior art bolt on volute-type scroll housing typically used as an industry standard centrifugal compressor.
Figure 5:
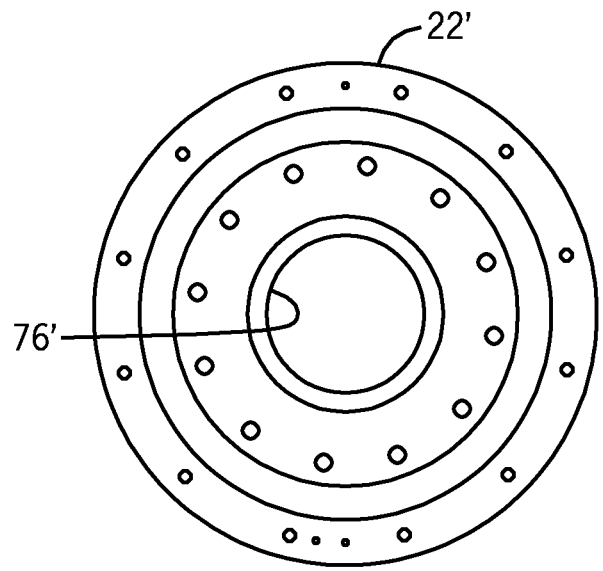
FIG. 5 shows an inlet assembly with the opening off center to address a shifted impeller shaft position from a change in pinion gear size on the impeller shaft.

As seen in FIGS. 1 and 2, the second and third stages, 12 and 14 are different than the first stage 10. The housings 56 and 58 are cylindrically shaped and receive a combination inlet/volute 24 and 26 respectively. Bolts 64 and 66, respectively secure the combination inlet/volute respectively to housings 56 and 58. The housings 56 and 58 are cast integrally with the lower gear box 20 and the intercooler housings 16 and 18. Second and third stages 12 and 14 illustrate the prior known technique and are included in the illustrated three-stage system to provide contrast for a clearer understanding of the advantages of the present invention. FIG. 4 also illustrates a prior art technique, which provides further contrast and understanding of the advantages of the present invention. In the illustrative stage 90 of FIG. 4, the machined scroll/volute 90 is a complicated piece having numerous machined surfaces, each of which necessarily has a tolerance on one or both sides of the ideal dimension. Impeller 92 has a plurality of blades 96 extending radially from near its center. A clearance in the radial direction is required as between the blades 96 and surface 98 on inlet/volute 94. The location and orientation of this clearance is also seen in FIG. 3, which is a close-up of first stage 10, illustrating the clearance in the case of the present invention. The clearance 72 in the first stage 10 can be reduced to less than 0.020 inches as compared to the stage 90 where the counterpart clearance can run in the range of 0.024-0.035 inches or greater. The clearance 72 is obtained solely as a result of a casting followed by a machining process. To date, commercially available equipment of the type shown in FIG. 4 has not been built with smaller clearances. While, theoretically, a coating process can be employed to further reduce clearances in the prior FIG. 4 design below 0.024 inches, practically, these techniques have not been employed in centrifugal compressor applications for reasons of quality control problems and prohibitive cost.

The reason a smaller clearance is obtained in the first stage 10 is that it incorporates a volute type scroll as the housing 74. Inlet 22 has an opening 76 made of a surface 78, which conforms to the outer periphery of blades 80. The radial clearance 72 eventually becomes an axial clearance in conformity to the shape of blades 80. Since the volute is cast integrally to the housing 74 there are fewer surfaces to machine on the casting and on inlet 22 to fit them up. The ultimate blade clearance 72 can be smaller than in the stage 90 because there are fewer opportunities for the accumulated tolerances on the various machined surfaces to add up when the volute type scroll is cast integrally as housing 74. There are also reduced man-hours for assembly of the first stage 10 as well as labor savings in reduced machining. The disadvantage of the second stage 12 is that by combining the volute into the inlet 60 and then inserting the inlet 60 into the cylindrically shaped housing 56 the outer profile of housing 56 is increased due to a near doubling of the wall thickness at the periphery. To illustrate the concept, had the first stage 10 been built in the same manner as the second stage 12 using the same exterior dimensions for the casting shown in FIG. 1, there would have been no room to mount the oil pump 52 and coupling 54 to the shaft 28 between the first and second stages 10 and 12 respectively. As previously stated, being able to power the oil pump 52 off of shaft 28 becomes an issue if there is a power failure from the perspective of protecting the bearings such as 42. The other alternative of simply making the entire casting larger adds significant cost to the finished product.

It should be noted that with regard to the first stage 10, that the diffuser plate 82 is secured to inlet 22 with bolts 84 before fitting up inlet 22 to the volute type scroll housing 74 using bolts 86. The clearance 72 minimization allows the first stage to achieve an efficiency improvement of 1-2% and slightly more. This improvement is magnified in the subsequent stages of compression. Operating expenses can be reduced and a smaller driver utilized because of the reduction in internal leakage from use of smaller clearances. Of course, even greater efficiency can be obtained from using the volute type scroll cast integrally as the housing in all stages in a multistage assembly such as shown in FIG. 1. The oil pump 52, even if there is a power failure, continues to deliver enough oil to all the bearings as shaft 28 slows down but continues to drive the oil pump 52.

Referring to FIG. 2 it can be seen that gearbox 20 is made integrally with housing 74 to accept a predetermined spacing between shaft 28 for bull gear 32 and shaft 38 for the pinion gear 34. To make all the parts go together, the air seal 40 has a properly located bore (not shown) through which the pinion shaft 38 extends. The inlet assembly 22 has an inlet opening 76 to align it with the impeller 36. Referring to FIG. 3, it can be seen that the diffuser 82 is part of the inlet assembly 22 and also features an opening (not shown) in which the impeller 36 resides.

The question comes up and the present invention addresses, what happens if a compressor assembly is constructed to a given speed for the first stage 10 for example and the operator has experienced a change in conditions and want to increase the speed. The original equipment manufacturer wants to be able to help the customer change the speed but issues arise as to what to stock in inventory and the cost of maintaining a variety of parts to accommodate a variety of selected driven speeds. Typically, the bull gear 32 is the largest gear in the gearbox and is very expensive to produce in a variety of teeth count configurations. If the bull gear 32 is not changed then a speed change involves changing the teeth count of the pinion 34 to reduce teeth for a speedup or increase teeth for a slowing down of the first stage 10 for example. However, fitting a new pinion gear 34 changes the center to center distance between shafts 28 and 38 and the integral casting of the gearbox 20 and the housing 74 was to a fixed center to center distance.

Figure 6:
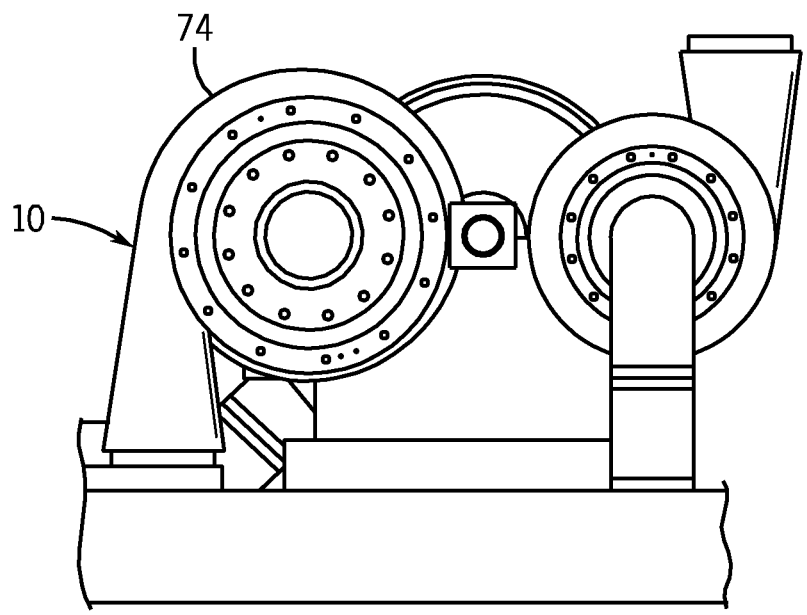
FIG. 6 is an end view showing the inlet of FIG. 5 assembled to a scroll.
Figure 7:
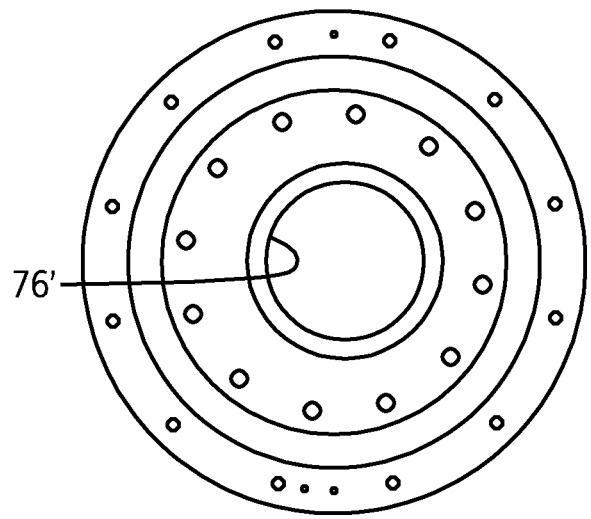
FIG. 7 shows, the orientation of the inlet with the opening shifted right.
Figure 8:
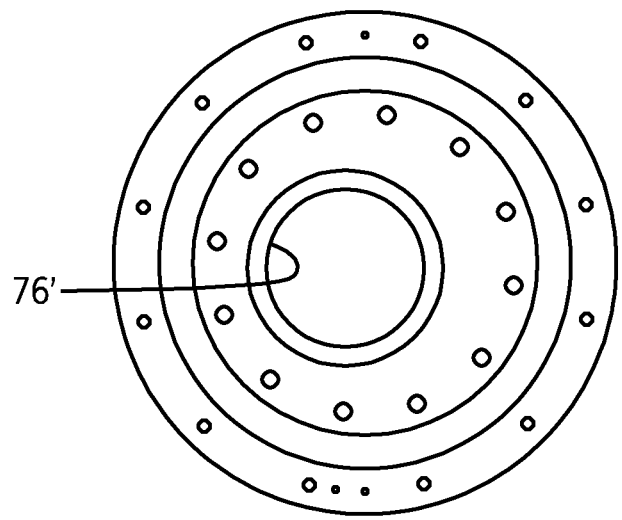
FIG. 8 shows the orientation of the inlet with the opening shifted left.
Figure 9:
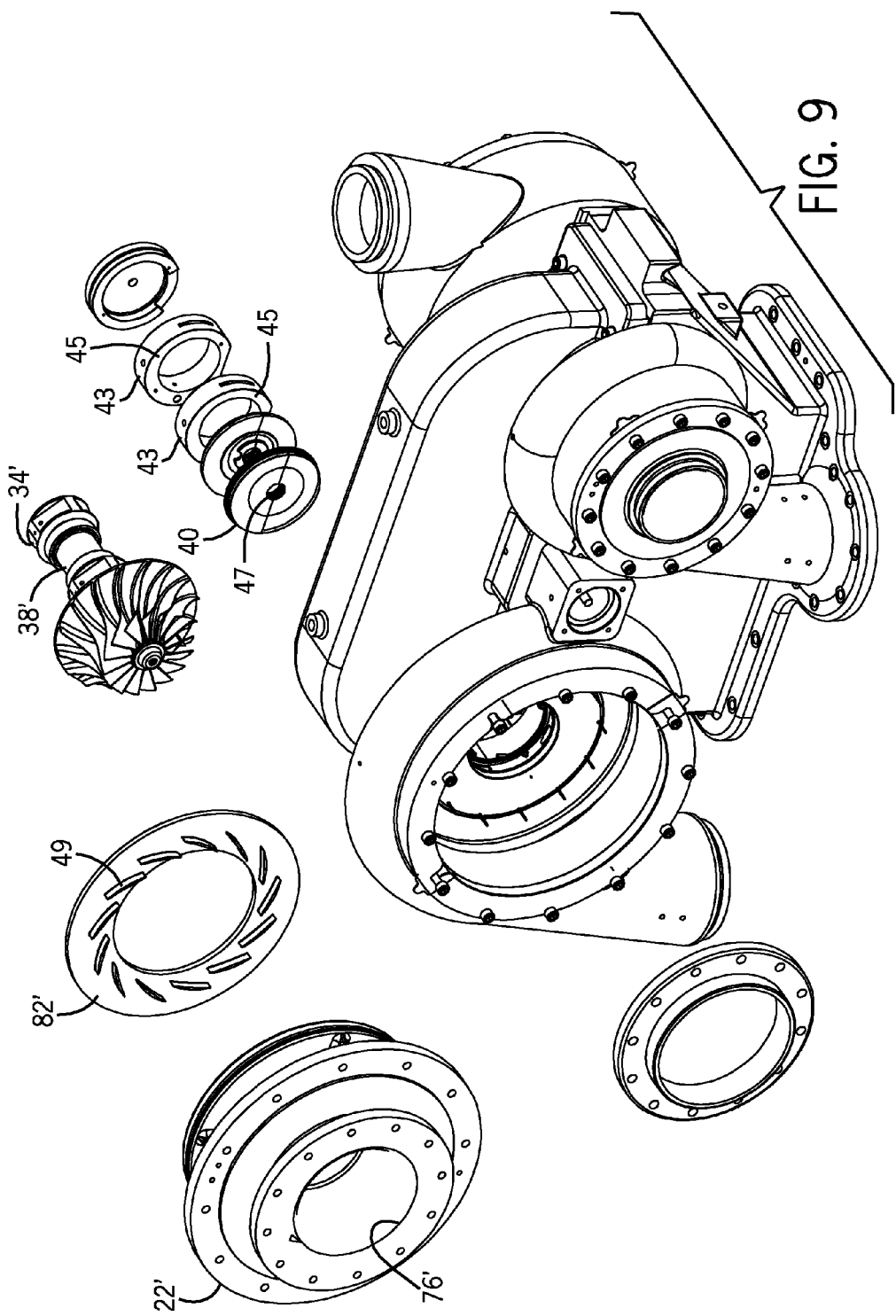
FIG. 9 is an exploded view showing how a change in pinion size can be addressed.

It is believed the present invention solves this problem. If the pinion 34 is replaced with a smaller gear to speed up the first stage 10, for example, the bearings 42' on either side of new pinion 34' must be relocated within the housing 20 to adapt to the new center to center shaft distance. FIG. 9 shows the bearing housings 43 with offset bores 45 to offset the bearings 42' for a change in shaft center distance created by use of the new pinion 34'. In order to allow the shaft 38' to enter the housing 74 through the air seal 40 the opening in it 47 is made eccentric to its center. This eccentric bore concept for the seal is also addressed for the inlet assembly 22' and the diffuser 82' connected to it. FIGS. 5-8 show the inlet assembly 22' with an off-center opening 76' relative to the bolt circle diameter that accepts bolts 86 (see FIG. 3). FIG. 6 shows the modified inlet assembly 22' mounted to housing 74 of the first stage, for example. FIGS. 7 and 8 show the rotated left and rotated right positions for the inlet 76', respectively. Those skilled in the art will appreciate that the opening 49 in the diffuser 82 is preferably aligned with opening 76' in inlet 22' so that the impeller 36 fits within diffuser 82 while the shaft 38' goes through an eccentric opening relative to the center of seal 40 so that seal 40 fits in the same opening as before but now creates an offset bore for shaft 38. The same result occurs for the bearings for shaft 38'. As a result of the offset opening 76' in inlet assembly 22' and the matching opening in the diffuser 82' attached to it as well as a similar offset in air seal 40 there are now two positions at minimum for the center to center distance between shafts 28 and 38' if they are kept at the same horizontal plane. Even more center to center distance changes are possible if the shafts are not limited to being in the same horizontal plane. Alternatively, the end user that requires a speed change can also buy a different inlet assembly 22' with a diffuser 82 having a matching bore offset to accommodate the impeller 38 and just purchase those components with a new air seal 40 and relocate the bearings 42 closer or further away, as needed and everything can go back together and function in the existing equipment that has the integral gear box 74 and housing 74.

As an alternative, offset bearing holders similar to those shown for the pinion shaft 38' can be used for the bull gear shaft 28. In that way, the bull gear can be relocated closer or further from a pinion shaft 38 that itself can be moved or left where it is. In a given gearbox and scroll combination housing the speed can be changed with a change of the pinion size, the bull gear size or by changing both depending on the desired end speed for the compressor stage that is desired. The center distance can be increased or decreased by moving one or both pinion and bull gear shafts. Offset mounting for the shafts are made possible by mounts with eccentric capabilities that allow the original components such as bearings and seals to be mounted in a variety of positions to accommodate the new shaft location within an existing gearbox. Speed changes are now possible for such precast units without major expense of obtaining new gearbox with scroll integrated housings.

While the invention has been described and illustrated in detail in the drawings and foregoing description, the same is to be considered as illustrative and not restrictive in character, it being understood that only the preferred embodiment has been shown and described and that all changes and modifications that come within the scope of the claims below are the full scope of the invention being protected.

The invention claimed is:

1. A compressor, comprising:
   an integrally produced combination of a at least a portion of a gearbox housing and at least a portion of a compressor housing with openings at a predetermined distance for a driving shaft into the gearbox housing and a driven shaft from the gearbox housing into the compressor housing;
   the compressor housing further comprising a seal assembly through which a driven shaft enters, the driven shaft further comprising a first driven gear and an end element disposed on the driven shaft and located in the compressor housing;
   the gear box housing further comprising a driving shaft and a driving gear engaged to the first driven gear;
   the seal assembly further comprising an offset opening with respect to a center thereof, whereupon the first driven gear is replaceable with a second driven gear of a different size that changes the shaft to shaft center distance and the seal assembly can accommodate the changed shaft to shaft center distance by reorientation of the offset opening.

2. The assembly of claim 1, further comprising:
an inlet assembly further comprising an inlet opening located off center thereto, the assembly adapted to be mounted to the compressor housing in a plurality of orientations to change the position of the inlet opening with respect to the compressor housing.

3. The assembly of claim 2, further comprising:
a diffuser comprising a diffuser opening and supported by the inlet assembly;
the diffuser opening aligned with the inlet opening such that both the openings move a like amount on reorientation of the inlet assembly with respect to the compressor housing.

4. The assembly of claim 3, wherein:
the offset opening is capable of being aligned with the diffuser and inlet openings in a plurality of orientations with respect to the compressor housing;
the offset, diffuser and inlet openings are capable of alignment in a plane defined by the shafts or above or below the plane; and
the end element comprises an impeller and the compressor housing comprises at least a single stage centrifugal compressor.

5. The assembly of claim 2, wherein:
the inlet assembly is mounted to the compressor housing on a side opposite from the seal assembly.

6. The assembly of claim 5, wherein:
the inlet opening and the offset opening in the seal assembly can be aligned in more than one position with respect to the compressor housing.

7. The assembly of claim 6, wherein:
the inlet and offset openings are aligned in the same plane as the shafts.

8. The assembly of claim 6, wherein:
the inlet and offset openings are above or below a plane that intersects the shafts.

9. A compressor, comprising:
an integrally produced combination of a at least a portion of a gearbox housing and at least a portion of a compressor housing with openings at a predetermined distance for a driving shaft into the gearbox housing and a driven shaft from the gearbox housing into the compressor housing;
the compressor housing further comprising a seal assembly through which a driven shaft enters, the driven shaft further comprising a first driven gear and an end element disposed on the driven shaft and located in the housing;
the gear box housing further comprising a driving shaft and a driving gear engaged to the first driven gear;
an inlet assembly further comprising an inlet opening located off center thereto, the assembly adapted to be mounted to the compressor housing in a plurality of orientations to change the position of the inlet opening with respect to the compressor housing.

10. The assembly of claim 9, wherein:
a diffuser comprising a diffuser opening and supported by the inlet assembly;
the diffuser opening aligned with the inlet opening such that both the openings move a like amount on reorientation of the inlet assembly with respect to the compressor housing.

11. The assembly of claim 10, wherein:
the diffuser and inlet openings are capable of alignment in a plane defined by the shafts or above or below the plane.

12. The assembly of claim 11, wherein:
the seal assembly further comprising an offset opening with respect to a center thereof, whereupon the first driven gear is replaceable with a second driven gear of a different size that changes the shaft to shaft center distance and the seal assembly can accommodate the changed shaft to shaft center distance by reorientation of the offset opening.

13. The assembly of claim 12, wherein:
the inlet assembly is mounted to the compressor housing on a side opposite from the seal assembly.

14. The assembly of claim 13, wherein:
the inlet opening and the offset opening in the seal assembly can be aligned in more than one position with respect to the compressor housing.

15. The assembly of claim 14, wherein:
the offset opening is capable of being aligned with the diffuser and inlet openings in a plurality of orientations with respect to the compressor housing.

16. The assembly of claim 15, wherein:
the offset, diffuser and inlet openings are capable of alignment in a plane defined by the shafts or above or below the plane.

17. The assembly of claim 16 wherein:
the end element comprises an impeller and the compressor housing comprises at least a single stage centrifugal compressor.

18. A compressor, comprising:
an integrally produced combination of a at least a portion of a gearbox housing and at least a portion of a compressor housing with openings at a predetermined distance for a driving shaft into the gearbox housing and a driven shaft from the gearbox housing into the compressor housing;
the compressor housing further comprising a seal assembly through which a driven shaft enters, the driven shaft further comprising a first driven gear and an end element disposed on the driven shaft and located in the compressor housing;
the gear box housing further comprising a driving shaft and a driving gear engaged to the first driven gear;
the driving shaft comprising bearings with off-center mounts to allow the driving shaft to be moved closer or further from the driven shaft to accommodate a change in at least one of the gears.

19. The assembly of claim 18, wherein:
the seal assembly further comprising an offset opening with respect to a center thereof, whereupon the first driven gear is replaceable with a second driven gear of a different size that changes the shaft to shaft center distance and the seal assembly can accommodate the changed shaft to shaft center distance by reorientation of the offset opening.

20. The assembly of claim 18, wherein:
the driven shaft comprises a bearing assembly having bearings movable within an offset mount that allows the driven shaft to be moved closer or further from the driving shaft by reorientation of the bearings in their mount.

* * * * *